Sept. 22, 1964     W. W. MAYS     3,149,657
TIRE CHAIN MOUNTING AND TIGHTENING MEANS
Filed March 8, 1963     2 Sheets-Sheet 1
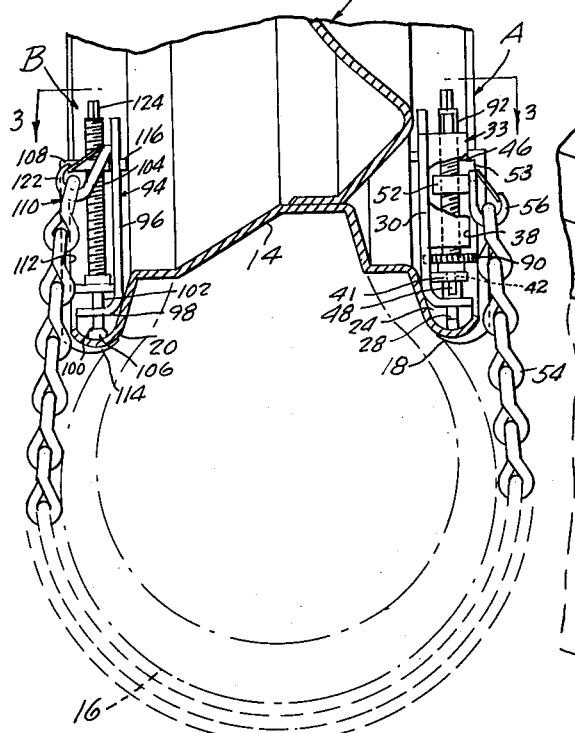
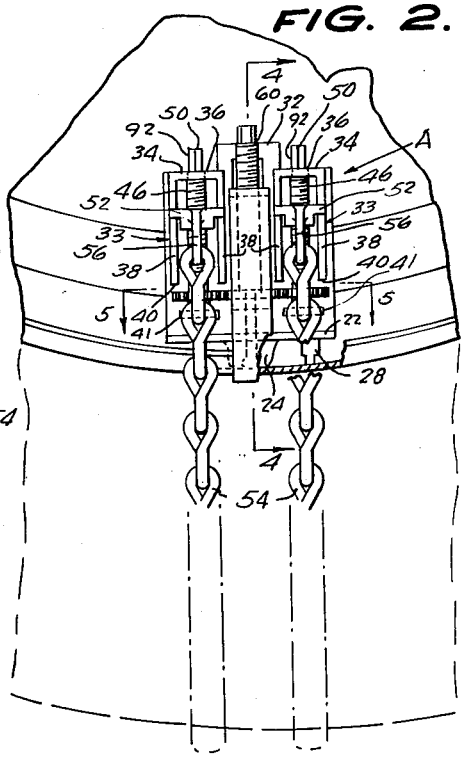
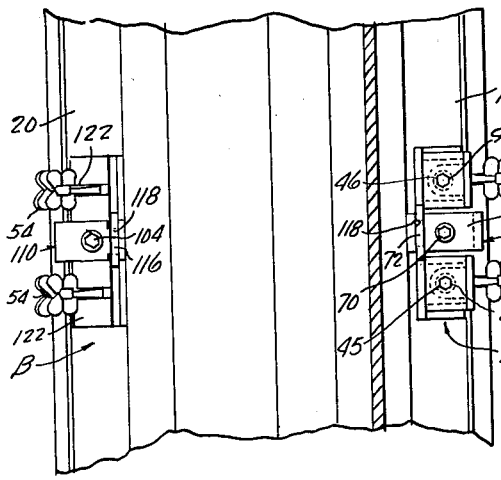
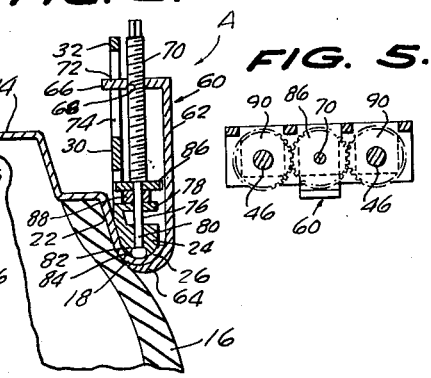
INVENTOR.
WILBURT W. MAYS,
BY
McMorrow, Berman & Davidson
ATTORNEYS.

Sept. 22, 1964    W. W. MAYS    3,149,657
TIRE CHAIN MOUNTING AND TIGHTENING MEANS
Filed March 8, 1963    2 Sheets-Sheet 2
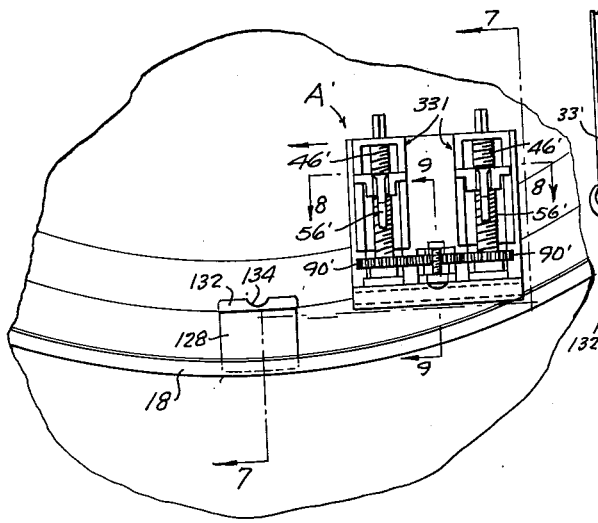
FIG. 6.
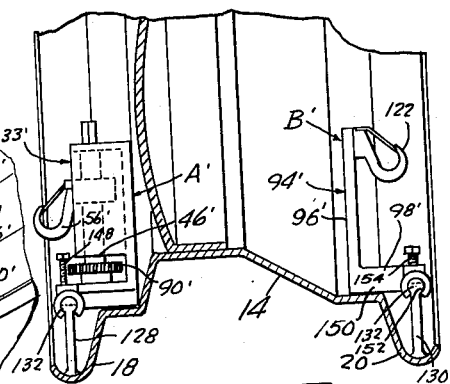
FIG. 7.
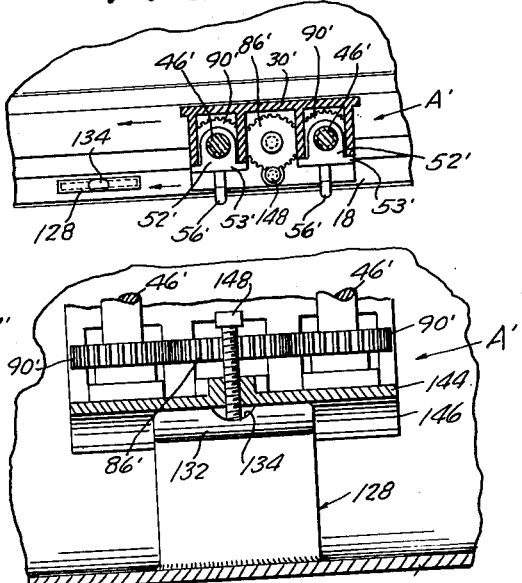
FIG. 8.
FIG. 9.
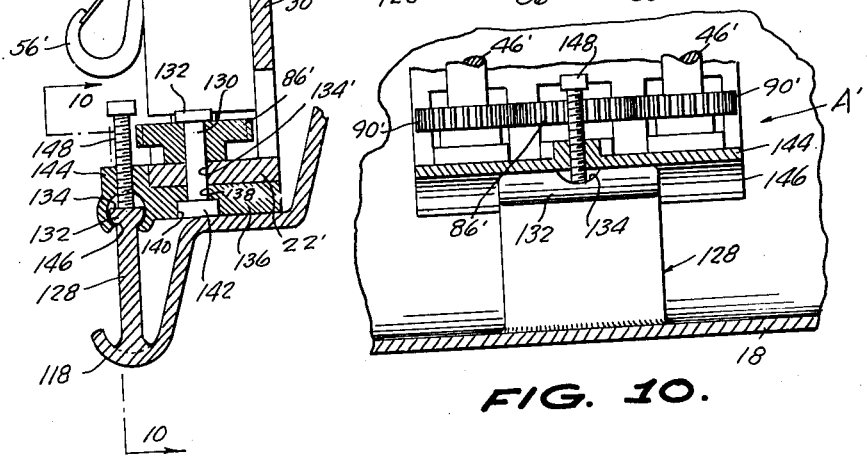
FIG. 10.
INVENTOR.
WILBURT W. MAYS,
BY
McMorrow, Berman & Davidson
ATTORNEYS.

3,149,657
TIRE CHAIN MOUNTING AND
TIGHTENING MEANS
Wilburt W. Mays, 2020 N. 8th St., Philadelphia 22, Pa.
Filed Mar. 8, 1963, Ser. No. 263,863
10 Claims. (Cl. 152—236)

This invention relates to novel adjustable mounting and tightening means for tire cross chains.

The primary object of the invention is the provision of more efficient and more easily applied means for the character indicated which includes members adapted to be removably clamped on the oposite sides of a vehicle wheel tire rim, one of the members being adapted to be initially adjusted and the other to be both initially and subsequently adjusted for properly tensioning the chains.

Another object of the invention is the provision of means of the character indicated above which involves pairs of tire cross chains and separate adjustable elements having hooks to which the chains are severally and removably connected, and single adjusting elements operatively connected to the hook-carrying elements for adjusting both hooks at the same time and to the same degree.

Other important objects and advantageous features of the invention will be apparent from the following description and the accompanying drawings, wherein, for purposes of illustration only, a specific form of the invention is set forth in detail.

In the drawings:

FIGURE 1 is a vertical transverse section taken through a vehicle tire rim and mounting and tightening in accordance with the present invention;

FIGURE 2 is an elevation of the right-hand side of FIGURE 1;

FIGURE 3 is a fragmentary horizontal section taken on the line 3—3 of FIGURE 1;

FIGURE 4 is a fragmentary vertical transverse section taken on the line 4—4 of FIGURE 2;

FIGURE 5 is a horizontal section taken on the line 5—5 of FIGURE 2;

FIGURE 6 is an outboard side elevation of another form of the invention, the related mounting and chain-tightening member being shown in process of application to a tire rim;

FIGURE 7 is a fragmentary vertical transverse section taken on the line 7—7 of FIGURE 6;

FIGURE 8 is a horizontal section taken on the line 8—8 of FIGURE 6;

FIGURE 9 is an enlarged vertical transverse section taken on the line 9—9 of FIGURE 6; and FIGURE 10 is a fragmentary vertical longitudinal section taken on the line 10—10 of FIGURE 9.

Referring in detail to the drawings, wherein like and related numerals designate like and related parts throughout the several views, and first to FIGURES 1 through 5, a vehicle wheel 12 is shown, having a rim 14, upon which a pneumatic tire 16 is mounted. The rim 14 has outboard and inboard channels 18 and 20, respectively, on which are shown outboard tightening members and inboard chain mounting members A and B, respectively.

The outboard member or chain tightening member A comprises a base plate 22 having a central pendant block 24, spaced from its ends, which, as shown in FIGURE 4, has a convex undersurface 26, which conformably seats in the outboard rim channel 18. Feet 28, spaced from the block 24 and related ends of the base plate 22, are proportioned to engage in the channel 18 so as to prevent rocking of the member A in the channel 18.

A flat straight vertical inboard wall 30 rises from the base plate 22 along its inboard edge, and has, on its upper edge an upward extension 32, equally spaced from the ends of the wall. At the opposite sides of the extension 32, the wall 30 has, on its outboard side, similar inverted U-shaped housings 33 which are composed of top walls 34, provided with central threaded openings 36, and parallel spaced side walls 38, whose lower ends 40 are spaced upwardly from the base plate 22. Spaced between the base plate 22 and the lower ends of the side walls 38 are outboardly extending lugs 41, formed centrally with smooth holes 42, smaller in diameter than the threaded holes 36.

Adjustable tightening screws 46 are threaded downwardly through the top wall openings 36 and have reduced diameter pintles 48, on their lower ends, which are journalled in the lug holes 42. The screws 46 have hexagonal wrench grip terminals 50, on their upper ends. Slides 52 are threaded on the screws 46, below the top walls 34, and have outboard flanges 54 which bear slidably and non-rotatably against the outboard edges of the side walls 38, whereby rotation of the screws 46, in opposite directions, elevates and depresses the slides 52 for tightening and loosening, on the tire 16, cross chains 54, which are removably engaged, at their ends, over snap hooks 56 which extend downwardly from the slides 52.

The member A is adapted to be clamped to the rim channel 18, by means of a clamp 60, located between the housings 33. The clamp 60 comprises a vertical J-shaped bar composed of a straight vertical portion 62 having a crook 64, on its lower end, adapted to embrace the convex underside of the rim channel 18, as shown in FIGURE 4. On the upper end of the vertical portion 62 is an inboardly extending arm 66, having a central threaded hole 68, through which a vertical clamping screw 70 is threaded. The arm 66 has a reduced width finger 72, on its inboard end, which is slidably confined in a vertical seat 74, provided in the vertical enclosed wall 30.

The clamping screw 70 has a reduced diameter smooth extension 76, on its lower end, which is journalled through the base plate 22 and the block 24, as indicated at 78 and 80, respectively, and a retaining head 82, on the lower end of the extension 76, is seated in a recess 84 in the underside of the block 24.

An idler gear wheel 86 is journalled on the clamping screw extension 76, between the lower end of the screw 70 and a spacer 88, circumposed on the extension 76 and bearing upon the base plate 22. The idler wheel 86 is in mesh with gear wheels 90 fixed on the tightening screws 46. The arrangement is such that the clamping screw 70 can be rotated for loosening or clamping the clamp 60 to the rim channel 18, without producing rotation of the tightening screws, whereas rotation of either one of the tightening screws, by a tool applied to the polygonal terminals 92 on their upper ends, produces similar rotation of the other tightening screw.

The inboard member or chain anchoring member B comprises a vertical L-shaped support plate 94, having a standard portion 96 and an outboardly extending foot portion 98, provided with a central hole 100, through which is journalled a reduced diameter smooth extension 102, in the lower end of a vertical clamping screw 104, having an elongated block 106, on its lower end, which seats conformably in the inboard rim channel 20.

The clamping screw 104 is threaded through an inboardly extending arm 108 on the upper end of a J-shaped clamp 110 having a vertical portion 112, formed with a crook 114, on its lower end, which conformably embraces the convex underside of the rim channel 20. The arm 108 has a reduced width finger 116, on its inboard end, which slides in a vertical slot 118, formed in the standard portion 96 of the support plate 94. Stationary snap hooks 122 are fixed on the standard portion 96, at opposite sides of the clamping screw, in which, the related ends of the cross chains are engaged.

It is to be observed that the inboard member B is quickly and easily installed, simply by applying the block 106 and the clamp crook 114 to the inboard rim channel 20 and tightening the clamping screw 104, by means of a tool applied to a polygonal terminal 124 on the upper end thereof; and that the member A can be as quickly and easily applied to the outboard tire channel 18. The cross chains having been brought around the tire, the related ends are engaged in the snap hooks 56 of the outboard member A, whereat either one of the tightening screws 46 is rotated for tightening both chains simultaneously and to the same degree.

In the form of the invention shown in FIGURES 6 through 10, the outboard and inboard tire rim channels 18 and 20, are provided with similar fixed upstanding clamp anchors 128 and 130, respectively, in the form of plates extending lengthwise of the channels 18 and 20, and having enlarged diameter ribs 132, extending along their upper edges, which have retaining notches 134, in their top surfaces, which are equally spaced from the ends of the plates.

The outboard member A′ comprises an L-shaped support plate having a vertical standard 30′ and an outboardly extending foot portion or base plate 22′, housings 33′ similar to the housings 33 of FIGURES 1 to 5, being formed on the outboard side of the standard portion 30′ and spaced above the base plate 22′ and containing slides 52′, like the slides 52, on which snap hooks 56′ are fixed, the slides being threaded on similar tightening screws 46′, which carry fixed gear wheels 90′. An idler gear wheel 86′ is journalled on a vertical pin 130, beneath an enlarged head 142, on the upper end thereof, the pin extending downwardly through a bore 134, in the base plate 22′.

Suitably affixed to the underside of the base plate 22′ is a horizontal mounting plate 136, having a bore 138, receiving the pin 130, and a socket 140, receiving the enlarged head 142, on the lower end of the pin. The mounting plate 136 has an outboard extension 144, which extends beyond the base plate 22′, and bears thereagainst, and is formed with a lengthwise three-quarter cylindrical, downwardly opening groove 146, which, as indicated in FIGURE 6, is adapted to be slid endwise over the rib 132 of the outboard clamp anchor 128. A locking screw 148 is threaded downwardly through the extension 144, to engage in the retaining notch 134, to lock the member A in place.

The member B′ comprises an L-shaped support plate 94′ having a pair of fixed snap hooks 122 spaced along its standard portion 96′, and having a foot portion 98′. A mounting plate 150, similar to the mounting 136, has a three-quarter, downwardly opening groove 152, similar to the groove 146, which receives the rib 132 of the inboard anchor 130, into whose retaining notch 134, a locking screw 154, similar to the locking screw 148, engages.

The demounting of the members A′ and B′ is done simply by backing out the locking screws 148 and 154 out of the retaining notches 134, and sliding these members endwise off the anchors 128 and 130.

It will be understood that the units A, A′ and B, B′ can be installed on either the outboard or inboard rim channels 18 and 20, respectively.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tire rim having a tire thereon, said rim having side channels, a cross chain anchoring member clamped on one of said channels, a chain tightening member comprising a support and clamped on the other rim channel, cross chain means extending between and connected to the members, said other rim channel having an outstanding anchor having an enlarged cylindrical longitudinal rib, said support having a three-quarter circular groove slidably receiving the rib, and a locking screw on the support engaged with the rib.

2. In combination, a tire rim having a tire thereon, said rim having side channels, a cross chain anchoring member clamped on one of said channels, a chain tightening member clamped on the other rim channel, cross chain means extending between and connected to the members, said tightening member comprising a support having spaced housings thereon, tightening screws journalled in the housing, slides threaded on the screws, snap hooks fixed on the slides with which the cross chain means are connected.

3. In combination, a tire rim having a tire thereon, said rim having side channels, a cross chain anchoring member clamped on one of said channels, a chain tightening member clamped on the other rim channel, cross chain means extending between and connected to the members, said tightening member comprising a support having spaced housings thereon, tightening screws journalled in the housing, slides threaded on the screws, snap hooks fixed on the slides with which the cross chain means are connected, a clamping screw journalled on the support between the housings, a clamp threaded on the clamping screw, said support having a block engaged in the first rim channel and said clamp having a crook embracing the underside of said first channel.

4. In combination, a tire rim having a tire thereon, said rim having side channels, a cross chain anchoring member clamped on one of said channels, a chain tightening member clamped on the other rim channel, cross chain means extending between and connected to the members, said tightening member comprising a support having spaced housings thereon, tightening screws journalled in the housings, slides threaded on the screws, snap hooks fixed on the slides with which the cross chain means are connected, a clamping screw journalled on the support between the housings, a clamp threaded on the clamping screw, said support having a block engaged in the first rim channel and said clamp having a crook embracing the underside of said first channel, said clamping screw having an idler gear wheel journalled thereon, said tightening screws having gear wheels fixed thereon and in mesh with the idler gear wheel.

5. In combination, a tire rim having a tire thereon, said rim having side channels, a cross chain anchoring member clamped on one of said channels, a chain tightening member clamped on the other rim channel, cross chain means extending between and connected to the members, said tightening member comprising a support plate having spaced housings thereon, tightening screws journalled in the housings and having fixed gear wheels thereon, slides confined in the housings and threaded on the tightening screws and carrying snap hooks over which the chain means are engaged, and an idler gear wheel journalled on the support between the fixed gear wheels and in mesh with the fixed gear wheels.

6. In combination, a tire rim having a tire thereon, said rim having side channels, a cross chain anchoring member clamped on one of said channels, a chain tightening member clamped on the other rim channel, cross chain means extending between and connected to the members, said tightening member comprising a support plate having spaced housings thereon, tightening screws journalled in the housings and having fixed gear wheels thereon, slides confined in the housings and threaded on the tightening screws and carrying snap hooks over which the chain means are engaged, and an idler gear wheel journalled on the support between the fixed gear wheels and in mesh with the fixed gear wheels, and means clamping the support to the first rim channel.

7. In combination, a tire rim having a tire thereon, said rim having side channels, a cross chain anchoring member clamped on one of said channels, a chain tightening member clamped on the other rim channel, cross chain means extending between and connected to the members, said tightening member comprising a support plate having spaced housings thereon, tightening screws journalled in the housing and having fixed gear wheels thereon, slides confined in the housings and threaded on the tightening screws and carrying snap hooks over which the chain means are engaged, and an idler gear wheel journalled on the support between the fixed gear wheels and in mesh with the fixed gear wheels, and means clamping the support to the first rim channel, said first rim channel having an outstanding anchor having a cylindrical rib, said support having a three-quarter circular groove slidably receiving the rib, and a locking screw threaded through the support and engaged with the rib.

8. In combination, a tire rim having side channels, a chain anchoring member clamped on one of said channels, a chain tightening member clamped on the other of said channels, cross chains extending between and connected to said members, said anchoring member comprising a clamp engaging said one channel, a clamping screw screwed through said clamp, an attaching means operatively connected to said clamp to which the adjacent ends of said chains are connected, and said tightening member comprising a clamp engaging said other channel, adjustable tightening screws cooperatively disposed with respect to said clamp of said tightening member, slides threaded on said tightening screws, and attaching means on said slides to which the adjacent ends of said chains are connected.

9. The combination according to claim 8, wherein each of said attaching means embodies snap hooks.

10. The combination according to claim 8, which includes in addition a clamping screw threaded through said tightening member clamp, and intermeshing gears on said last-mentioned clamping screw and said tightening screws, rotation of the gear on said clamping screw effecting loosening or clamping of said tightening member clamp without rotation of said gears on the tightening screws, and rotation of either one of the gears on the tightening screws effecting also rotation of the other of the gears on the tightening screws.

References Cited in the file of this patent

UNITED STATES PATENTS

| | | |
|---|---|---|
| 1,547,078 | Stuart | July 21, 1925 |
| 2,778,400 | Charlton | Jan. 22, 1957 |
| 2,975,815 | Rettew | Mar. 21, 1961 |
| 3,014,517 | Delano | Dec. 26, 1961 |